S. P. PARHAM.
Gas-Retorts.
No. 158,515.
Patented Jan. 5, 1875.
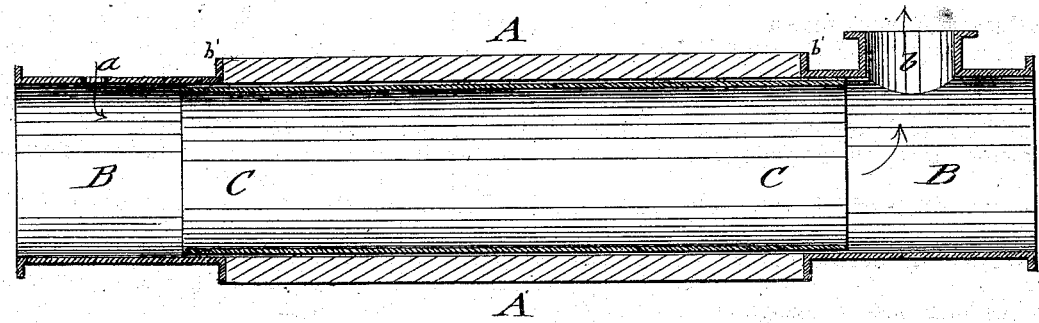
WITNESSES:
Chas. Nida.
Alex F. Roberts
INVENTOR:
S. P. Parham
BY Munn & Co
ATTORNEYS.

UNITED STATES PATENT OFFICE.

SAMUEL P. PARHAM, OF NEW YORK, N. Y.

IMPROVEMENT IN GAS-RETORTS.

Specification forming part of Letters Patent No. 158,515, dated January 5, 1875; application filed August 15, 1874.

*To all whom it may concern:*

Be it known that I, SAMUEL P. PARHAM, of New York city, have invented a Retort for Manufacturing Gas directly from Liquid Hydrocarbons, and especially the products of petroleum, of which the following is a specification:

The invention will first be fully described, and then pointed out in the claim.

The drawing represents a longitudinal section.

It has long been a recognized fact among gas-manufacturers that the main parts of a retort should be formed of fire-clay on the outside, wrought metal on the inside, and an intermediate air-space or compressible filling that will allow of expansion. Of course this renders necessary such a construction as will facilitate the replacement of the metallic lining, that wears out much more rapidly than the outside shell of clay.

My object is to make a retort that will admit of being taken apart easily and supplied with a new lining, while it will, at the same time, be adapted to the vaporization of naphtha directly from the liquid in sufficient purity to be at once mixed with purified coal-gas, and thus form a mixture that will make a stronger and cheaper light.

A represents the clay shell, and C the wrought-metal lining, the two being provided with an air-space that will admit of expansion. Hitherto one end of the retorts has been closed; but I make them with both ends open, extending the terminals of the lining beyond the shell, and on these extensions supporting the end tubes B B. The latter have outwardly-projecting flanges $b'$, against which abut the ends of the clay shell, and keep it firmly in place, the shell, lining, and tubes being all simply cemented together.

The operation is as follows: The naphtha liquid is forced or caused to flow through an aperture, $a$, into the initial tube B, and thence drawn through the lining C, wherein it loses its liquid form, assumes that of a gas, and is drawn through outlet $b$ by an exhauster. This has been found in practice to produce a very rich gas, sufficiently pure for mixing with the purified coal-gas. The tubes and lining, being merely held to the shell by a cement, which has no special affinity for either, are readily separated from it for the replacement of the lining.

Having thus described all that is necessary to a full understanding of my invention, what I claim is—

As a new article of manufacture, a retort for making an illuminating-gas directly from liquid naphtha, consisting of clay shell A, lining C, extending beyond both ends of the clay-shell and into the necks of the retort, and the end tubes B $a$ B $b$, all attached as shown and described.

SAML. P. PARHAM.

Witnesses:
PAUL GOEPEL,
T. B. MOSHER.